(12) United States Patent
Hatke et al.

(10) Patent No.: US 6,489,033 B1
(45) Date of Patent: Dec. 3, 2002

(54) ELECTRETS

(75) Inventors: Wilfried Hatke, Hofheim (DE); Gerhard Sessler, Darmstadt (DE); Guo-Mao Yang, Kingston (CA)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/445,553

(22) PCT Filed: Jun. 12, 1998

(86) PCT No.: PCT/EP98/03537

§ 371 (c)(1),
(2), (4) Date: Feb. 28, 2000

(87) PCT Pub. No.: WO98/56836

PCT Pub. Date: Dec. 17, 1998

(30) Foreign Application Priority Data

Jun. 13, 1997 (DE) .......................................... 197 25 253
May 19, 1998 (DE) .......................................... 198 22 381

(51) Int. Cl.[7] .......................... G11C 13/02; G11C 11/21; H01B 3/44; B32B 15/08; C08L 45/00
(52) U.S. Cl. ........................ 428/461; 526/281; 526/308; 526/348.1; 428/500; 525/210; 525/211; 525/240; 307/400; 365/146; 29/886
(58) Field of Search ................................ 526/308, 281, 526/348.1; 428/461, 500; 525/240, 210, 211; 307/400; 365/146; 29/886

(56) References Cited

U.S. PATENT DOCUMENTS 3,711,941 A 1/1973 Sessler et al.
4,944,854 A 7/1990 Felton et al.

FOREIGN PATENT DOCUMENTS

| DD | 211801 | | 7/1984 |
| EP | 0 769 371 | | 10/1996 |
| EP | 769371 A2 | * | 4/1997 |
| EP | 0 844 077 | | 10/1997 |
| JP | 04326910 | | 11/1992 |
| JP | 04326910 A | * | 11/1992 |
| JP | 8-41260 | * | 2/1996 |
| JP | 08041260 | | 2/1996 |

OTHER PUBLICATIONS

Derwent Accession No. 1996–157202 (1996).

* cited by examiner

*Primary Examiner*—David W. Wu
*Assistant Examiner*—R. Rabago
(74) *Attorney, Agent, or Firm*—Connolly Bove Lodge & Hutz LLP

(57) ABSTRACT

Electrets can be produced from cycloolefin copolymers (COCs), and charges applied thereto are stable for long periods, even at high temperatures and high relative humidities. The reduction here in a positive charge applied to the COCs is smaller than that of negative charges applied to the COCs. The stability over time of the charges applied is impaired by adding polar additives, such as inorganic silicon compounds. Films, fibers or nonwovens produced from electrets can be processed to give filters.

13 Claims, 11 Drawing Sheets

Corona charging

Figure 1:
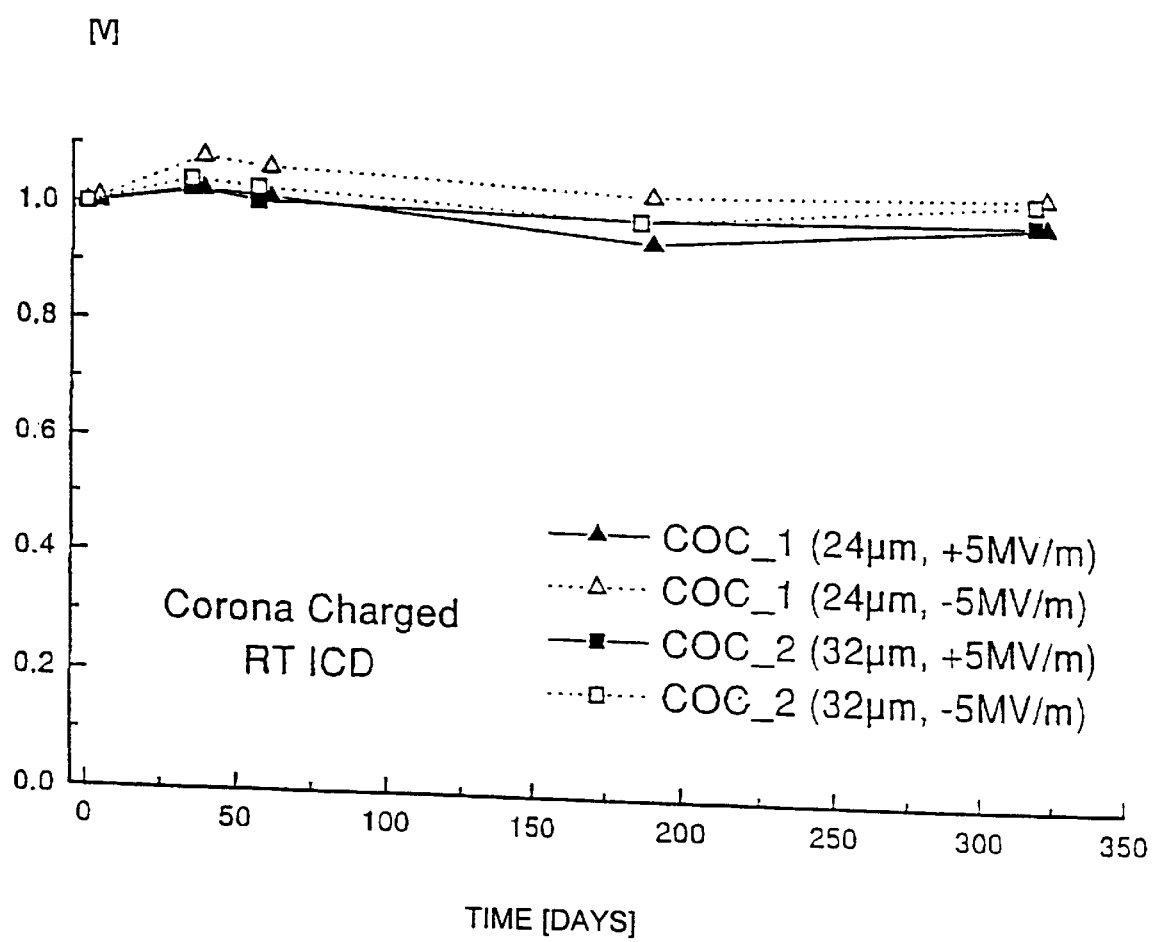

Surface potential (normalized) as a function of time (days)

Corona charging
Surface potential (normalized) as a function of time (days)

Corona charging
Surface potential (normalized) as a function of time (days)

Corona charging (10 mV/m) 130 (°C)
Surface potential (normalized) as a function of time (days)

Corona charging
Thermally induced current (pA) as a function of temperature (°C)

Corona charging
Surface potential (normalized) as a function of time (days)

Corona charging

Surface potential (normalized) as a function of time (days)

ELECTRETS

The present invention relates to electrets, a process for their preparation and their use as films.

Electrets are materials with a permanent electrical polarity, similar to the permanent magnetic polarity in ferromagnetic materials. However, the term is also used, for example, for materials which have opposing charges on their surfaces, as in the case of films; cf. R. C. Brown et al.; J. Aerosol. Sci., Vol. 25, No. 1, page 149, 1994.

The ability to store charges in the interior or on the surface over relatively long periods of time is of great interest, especially in the particle filtration sector. Especially for small particles, the efficiency of electrets is markedly higher than that of uncharged filter media when separating particles from a medium to be filtered, such as a gas or liquid. Materials particularly suitable for preparing electrets are those which have insulating properties. Polymers are therefore particularly good for preparing electrets, due to their high electrical resistances and their good processability.

The performance of electrets depends on the nature of the polymer used. U.S. Pat. No. 4,288,584 describes the preparation of electrets based on polymers such as polycarbonate and polyester. However, the initially high surface potential of electrets made from these polymers reduces again relatively rapidly. This applies especially when the humidity is high. Electrets based on simple polyolefins are also described. The surface potentials of electrets based on these polymers is described as not very stable, especially at relatively high temperatures.

JP-A-08 41260 describes improvement in the stability of charges on electrets via the addition of polymers with polar side groups. However, the electrets of that invention, based on copolymers with cyclic olefins, were studied only over very short periods. In addition, even in these short periods of up to 24 hours some quite marked reductions of from 10 to 15% in surface potentials can be seen.

According to J. van Thournhout, the electret properties of polyolefins, such as polypropylene, cannot be improved by the addition of polar polymers or of polymers with polar side groups, cf. Conference Proceedings of the Dielectrics and Electrical Insulation Society, J. van Thournhout et al.; pp. 961–966 (1994).

There is therefore still a need for materials whose electret properties are retained even at very high temperatures and at very high humidity. Only fluoropolymers, such as polytetrafluorine ethylene (PTFE) have hitherto satisfactorily fulfilled these requirements. However, these polymers are expensive and require specific processing conditions, and this currently restricts their use for many electret applications. There remains therefore a high level of interest in materials for electrets which are simple to process and which, even at high temperatures and humidity, show no, or only slight, reduction in their charges.

The object of the present invention is to provide electrets which show no, or only slight, reduction in their charges at high temperature and high humidity, and also to provide a cost-effective and environmentally friendly process for preparing electrets.

The object of the present invention is achieved by electrets which comprise at least one cycloolefin polymer. The electrets preferably comprise at least one cycloolefin copolymer or a mixture with at least one cycloolefin copolymer and with at least one other polyolefin, whose proportions may be up to 40% (w/w).

The novel electrets preferably comprise at least one cycloolefin copolymer selected from the group consisting of polymers containing from 0.1 to 100% by weight, preferably from 0.1 to 99.9% by weight, based on the total weight of the cycloolefin polymer, of polymerized units of at least one cyclic olefin of the formulae I, II, II', III, IV, V or VI.

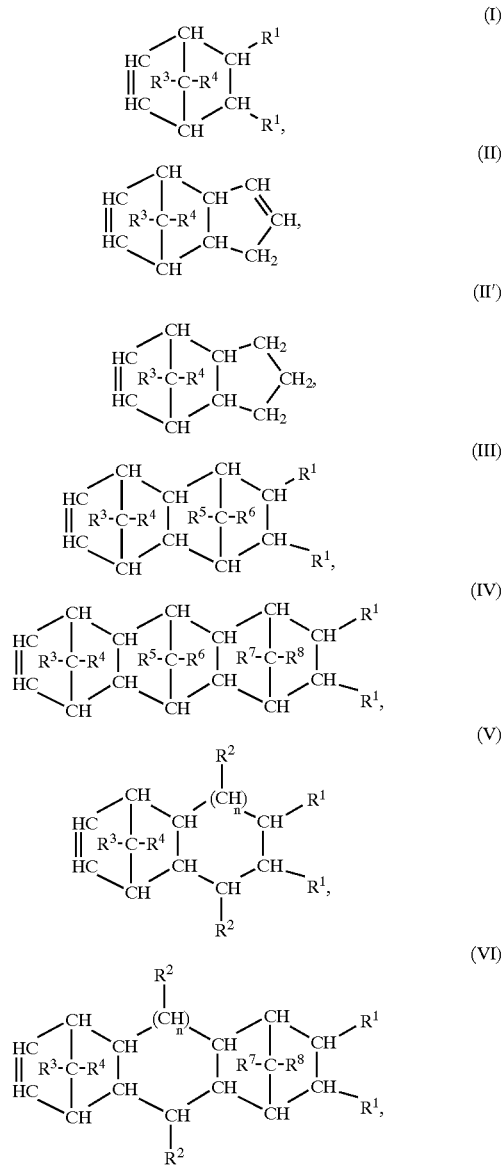

where $R^1$, $R^2$, $R^3$, $R^4$, $R^5$, $R^6$, $R^7$ and $R^8$ are identical or different and are a hydrogen atom or a $C_1$–$C_{20}$-hydrocarbon radical, such as a linear or branched $C_1$–$C_8$-alkyl radical, $C_6$–$C_{18}$-aryl radical or $C_7$–$C_{20}$-alkylenearyl radical, or a cyclic or acyclic $C_2$–$C_{20}$-alkenyl radical, or form a saturated, unsaturated or aromatic ring, where the same radicals $R^1$ to $R^8$ in the various formulae I to VI may have a different meaning, and where n may be from 0 to 5, and from 0 to 99 mol %, based on the total makeup of the cycloolefin copolymer, of polymerized units which derive from one or more acyclic olefins of the formula VII.

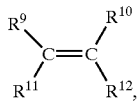

(VII)

where $R^9$, $R^{10}$, $R^{11}$ and $R^{12}$ are identical or different and are a hydrogen atom, a linear, branched, saturated or unsaturated $C_1$–$C_{20}$-hydrocarbon radical, such as a $C_1$–$C_8$-alkyl radical or a $C_6$–$C_{18}$-aryl radical.

The cycloolefin polymers may also be obtained by ring-opening polymerization of at least one of the monomers with the formulae I to VI followed by hydrogenation of the resultant products.

The electret contains from 0 to 45 mol % based on the total makeup of a cycloolefin copolymer, a polymerized units which derive from one or more monocyclic olefins of the formula (VIII):

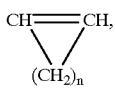

(VIII)

where n is from 2 to 10.

The proportion of the polymerized units which derive from cyclic, in particular polycyclic, olefins is preferably from 3 to 75 mol %, based on the total composition of the cycloolefin copolymer. The proportion of the polymerized units which derive from acyclic olefins is preferably from 5 to 80 mol %, based on the total composition of the cycloolefin copolymer.

The cycloolefin copolymers are preferably composed of polymerized units which derive from one or more polycyclic olefins, in particular polycyclic olefins of the formula I or III and polymerized units which derive from one or more acyclic olefins of the formula VII, in particular α-olefins having from 2 to 20 carbon atoms. Particular preference is given to cycloolefin copolymers which are composed of polymerized units which derive from a polycyclic olefin of the formula I or III and from an acyclic olefin of the formula VII. Preference is also given to terpolymers which are composed of polymerized units which derive from a polycyclic monoolefin of the formula I or II, from an acyclic monoolefin of the formula VII and from a cyclic or acyclic olefin which contains two double bonds (polyene), in particular cyclic, preferably polycyclic, dienes, such as norbornadiene, or cyclic, particularly preferably polycyclic, alkenes which have a $C_2$–$C_{20}$-alkenyl radical, such as vinylnorbornene.

The novel cycloolefin polymers preferably contain olefins with a fundamental norbornene structure, particularly preferably norbornene, tetracyclododecene and, if desired, vinylnorbornene or norbornadiene. Preference is also given to cycloolefin copolymers which contain polymerized units which derive from acyclic olefins with terminal double bonds, for example α-olefins having from 2 to 20 carbon atoms, particularly preferably ethylene or propylene. Particular preference is given to norbornene/ethylene copolymers and tetracyclododecene/ethylene copolymers.

Among the terpolymers, particular preference is given to norbornene-vinylnorbornene-ethylene terpolymers, norbornene-norbornadiene-ethylene terpolymers, tetracyclododecene-vinylnorbornene-ethylene terpolymers and tetracyclododecene-vinyltetracyclododecene-ethylene terpolymers. The proportion of the polymerized units which derive from a polyene, preferably vinylnorbornene or norbornadiene, is from 0.1 to 50 mol %, preferably from 0.1 to 20 mol %, and the proportion of the acyclic monoolefin of the formula VII is from 0 to 99.9 mol %, preferably from 5 to 80 mol %, based on the total composition of the cycloolefin copolymer. For the terpolymers, the proportion of the polycyclic monoolefin is from 0.1 to 99.9 mol %, preferably from 3 to 75 mol %, based on the total composition of the cycloolefin copolymer.

The cycloolefin copolymer of the invention preferably contains at least one cycloolefin copolymer which contains polymerized units which derive from polycyclic olefins of the formula I and contains polymerized units which derive from acyclic olefins of the formula VII.

The invention also relates to a process for preparing electrets which comprises applying an aluminum layer of thickness from 50 to 200 nm to one side of a cycloolefin copolymer film and the unmetallized side of the film is charged positively or negatively with an electrical field of from 5 to 15 kV/mm with a corona discharge or by bombardment with an electron beam and the surface potential is from 100 to 500 V.

The cycloolefin polymers are prepared by heterogeneous or homogeneous catalysis with organometallic compounds. Catalyst systems based on mixed catalysts made from titanium salts and from aluminum organyl compounds are described in DD-A-109 224 and DD-A-237 070. EP-A-156 464 describes the preparation with catalysts based on vanadium. EP-A-283 164, EP-A407 870, EP-A485 893 and EP-A-503 422 describe the preparation of cycloolefin polymers with catalysts based on soluble metallocene complexes. The preparation processes described in these patents for preparing cycloolefin copolymers and the catalyst systems used are incorporated herein by way of reference.

Examples of transition metal compounds used are:

rac-dimethylsilylbis(1-indenyl)zirconium dichloride,
rac-dimethylgermylbis(1-indenyl)zirconium dichloride,
rac-phenylmethylsilylbis(1-indenyl)zirconium dichloride,
rac-phenylvinylsilylbis(1-indenyl)zirconium dichloride,
1-silacyclobutylbis(1-indenyl)zirconium dichloride,
rac-diphenylsilylbis(1-indenyl)hafnium dichloride,
rac-phenylmethylsilylbis(1-indenyl)hafnium dichloride,
rac-diphenylisilylbis(1-indenyl)zirconium dichloride,
rac-ethylene-1,2-bis(1-indenyl)zirconium dichloride,
dimethylsilyl-(9-fluorenyl)(cyclopentadienyl)zirconium dichloride,
diphenylsilyl-(9-fluorenyl)(cyclopentadienyl)zirconium dichloride,
bis(1-indenyl)zirconium dichloride,
diphenylmethylene-(9-fluorenyl)cyclopentadienylzirconium dichloride,
isopropylene-(9-fluorenyl)cyclopentadienylzirconium dichloride,
rac-isopropylidenebis(1-indenyl)zirconium dichloride,
phenylmethylmethylene-(9-fluorenyl)cyclopentadienylzirconium dichloride,
isopropylene-(9-fluorenyl)(1-(3-isopropyl)cyclopentadienyl)zirconium dichloride,
isopropylene-(9-fluorenyl)(1-(3-methyl)cyclopentadienyl)zirconium dichloride,
diphenylmethylene-(9-fluorenyl)(1-(3-methyl)cyclopentadienyl)zirconium dichloride,
methylphenylmethylene-(9-fluorenyl)(1-(3-methyl)cyclopentadienyl)zirconium dichloride,
dimethylsilyl-(9-fluorenyl)(1-(3-methyl)cyclopentadienyl)zirconium dichloride, diphenylsilyl-(9-fluorenyl)(1-(3-methyl)cyclopentadienyl)
zirconium dichloride,
diphenylmethylene-(9-fluorenyl)(1-(3-tert-butyl)
cyclopentadienyl)zirconium dichloride,
isopropylene-(9-fluorenyl)(1-(3-tert-butyl)cyclopentadienyl)zirconium dichloride,
isopropylene(cyclopentadienyl)(1-indenyl)zirconium
dichloride,
diphenylcarbonyl(cyclopentadienyl)(1-indenyl)zirconium
dichloride,
dimethylsilyl(cyclopentadienyl)(1-indenyl)zirconium
dichloride,
isopropylene(methylcyclopentadienyl)(1-indenyl)zirconium
dichloride,
[4-($\eta^5$-cyclopentadienyl)-4,7,7-trimethyl($\eta^5$-4,5,6,7-tetrahydroindenyl)]zirconium dichloride,
[4-($\eta^5$-cyclopentadienyl)-4,7,7-triphenyl-($\eta^5$-4,5,6,7-tetrahydroindenyl)]zirconium dichloride,
[4-($\eta^5$-cyclopentadienyl)-4,7-dimethyl-7-phenyl-($\eta^5$-4,5,6,7-tetrahydroindenyl)]zirconium dichloride,
[4-($\eta^5$-3'-tert-butylcyclopentadienyl)-4,7,7-triphenyl-($\eta^5$-4,5,6,7-tetrahydroindenyl)]zirconium dichloride,
[4-($\eta^5$-3'-tert-butylcyclopentadienyl)-4,7-dimethyl-7-phenyl-($\eta^5$-4,5,6,7-tetrahydroindenyl)]zirconium dichloride,
[4-($\eta^5$-3'-methylcyclopentadienyl)-4,7,7-trimethyl-($\eta^5$-4,5,6,7-tetrahydroindenyl)]zirconium dichloride,
[4-($\eta^5$-3'-methylcyclopentadienyl)-4,7,7-triphenyl-($\eta^5$-4,5,6,7-tetrahydroindenyl)]zirconium dichloride,
[4-($\eta^5$-3'-methylcyclopentadienyl)-4,7-dimethyl-7-phenyl-($\eta^5$-4,5,6,7-tetrahydroindenyl)]zirconium dichloride,
[4-($\eta^5$-3'-isopropylcyclopentadienyl)-4,7,7-trimethyl-($\eta^5$-4,5,6,7-tetrahydroindenyl)]zirconium dichloride,
[4-($\eta^5$-3'-isopropylcyclopentadienyl)-4,7,7-triphenyl-($\eta^5$-4,5,6,7-tetrahydroindenyl)]zirconium dichloride,
[4-($\eta^5$-3'-isopropylcyclopentadienyl)-4,7-dimethyl-7-phenyl-($\eta^5$-4,5,6,7-tetrahydroindenyl)]zirconium dichloride,
[4-($\eta^5$-cyclopentadienyl)($\eta^5$-4,5-tetrahydropentalene)]zirconium dichloride,
[4-($\eta^5$-cyclopentadienyl)-4-methyl($\eta^5$-4,5-tetrahydropentalene)]zirconium dichloride,
[4-($\eta^5$-(-cyclopentadienyl)-4-phenyl($\eta^5$-4,5-tetrahydropentalene)]zirconium dichloride,
[4-($\eta^5$-cyclopentadienyl)-4-phenyl($\eta^5$-4,5-tetrahydropentalene)]zirconium dichloride,
[4-($\eta^5$-3'-methylcyclopentadienyl)($\eta^5$-4,5-tetrahydropentalene)]zirconium dichloride,
[4-($\eta^5$-3'-isopropylcyclopentadienyl)($\eta^5$-4,5-tetrahydropentalene)]zirconium dichloride,
[4-($\eta^5$-3'-benzylcyclopentadienyl)($\eta^5$-4,5-tetrahydropentalene)]zirconium dichloride,
[2,2,4-trimethyl-4-($\eta^5$-cyclopentadienyl)($\eta^5$-4,5-tetrahydropentalene)]zirconium dichloride,
[2,2,4-trimethyl-4-($\eta^5$-(3,4-diisopropyl)cyclopentadienyl)($\eta^5$-4,5tetrahydropentalene)]zirconium dichloride.

The following polyolefins may be used for preparing electrets based on mixtures of cycloolefin copolymers and polyolefins: homopolymers of ethylene and of propylene, and also copolymers of these two monomers, copolymers based on ethylene with linear or branched olefins, such as butene, pentene, hexene, heptene, octene, nonene, decene, undecene or dodecene, copolymers based on propylene with linear or branched olefins, such as butene, pentene, hexene, heptene, octene, nonene, decene, undecene or dodecene, or terpolymers made from ethylene, propylene or linear or branched olefins, such as butene, pentene, hexene, heptene, octene, nonene, decene, undecene or dodecene.

Cycloolefin copolymers based on comonomers, such as ethylene and 2-norbornene, are amorphous plastics. The heat resistance of the cycloolefin copolymers may be adjusted over a wide range by varying the proportions of the comonomers. For amorphous cycloolefin copolymers, the glass transition temperature may be used as a guide to the heat resistance, which may be determined to ISO 75 Part 1 and Part 2, on injection moldings. The HDT-B of the cycloolefin copolymers is from about 5 to 20° C. below the glass transition temperature. Cycloolefin copolymers may have HDT-Bs of from 20 to 250° C., preferably from 50 to 180° C. Since their heat resistance can be adjusted, they can be adapted to the respective application.

Cycloolefin copolymers are thermoplastic materials. They may therefore be processed by any of the known processes for processing thermoplastic polymers. These include extrusion of films or fibers, extrusion blow molding of films or bottles, injection blow molding, injection molding and calendering. The flowabilities of the melts may be adjusted by varying the glass transition temperatures and the molecular weights, and adapted to the conditions for the processing method.

The cycloolefin copolymers may be extruded to give flat films which may then be oriented biaxially or monoaxially under suitable conditions. Cycloolefin copolymers may also be spun to give fibers. Commonly used processes, such as the split-fiber process or the melt-blow process, may therefore be used to process cycloolefin copolymers to give electret nonwovens.

Cycloolefin copolymers may also be processed from solution. Suitable solvents are aprotic nonpolar hydrocarbons, such as decalin, or mixtures of linear or branched hydrocarbons. Cycloolefin copolymer nonwovens may be produced from polymer solutions by spinning.

Cycloolefin copolymer films have specific mechanical properties. After orientation, the cycloolefin copolymer films have a tough tensile properties.

There is a significant increase in the elongation at break and the penetration resistance of the films. The moduli of elasticity achieved, starting from a relatively high level of moduli of elasticity for the unoriented films, are from 3.5 GPa to 4.3 GPa, with tear strengths of up to 160 MPa. The differences in moduli and strengths between oriented and unoriented cycloolefin copolymer films are therefore small. They therefore permit the production of films with relatively isotropic mechanical properties. The high longitudinal modulus is of particular interest for low strain when the film is subjected to tensile loads during further processing.

Polymers based on copolymers made from ethylene and from cyclic olefins, such as 2-norbornene, have electret properties comparable with those of polytetrafluoroethylene, which has hitherto been the best polymeric material for electrets. However, these cycloolefin copolymers can be processed by the known processing methods, such as extrusion or injection molding, and significantly more easily than polytetrafluoroethylene. Mixtures of polyolefins such as polypropylene and COC also have very good electret properties.

The heat resistance of the cycloolefin copolymers may be adjusted by varying the proportions of the comonomers over a wide range. For amorphous cycloolefin copolymers, the glass transition temperature may be used as a guide to the heat resistance, which may be determined to the DIN standard on injection moldings. The HDT-B of the cycloolefin copolymers is from about 5 to 20° C. below the glass transition temperature. Cycloolefin copolymers may have HDT-Bs of from 20 to 250° C., preferably from 50 to 180° C. The ability to adjust the heat resistance means that the HDT-B can be adapted to the respective application.

Cycloolefin copolymers are thermoplastic materials. They may therefore be processed by any of the known processes for processing thermoplastic polymers. These include extrusion of films or fibers, extrusion blow molding of films or bottles, injection blow molding, injection molding and calendering. The flowabilities of the melts may be adjusted by varying the glass transition temperatures and the molecular weights, and adapted to the conditions for the processing method.

The cycloolefin copolymers may be extruded to give flat films which may then be oriented biaxially or monoaxially under suitable conditions.

Cycloolefin copolymers may also be spun to give fibers. Commonly used processes, such as the split-fiber process or the melt-blow process, may therefore be used to process cycloolefin copolymers to give electret nonwovens.

The films, fibers and nonwovens may be further processed to give filters.

The cycloolefin copolymers studied in the examples to investigate their electret properties were amorphous cycloolefin copolymers with glass transition temperatures of 140 and 160° C., and also a semicrystalline cycloolefin copolymer with a glass transition temperature of 135° C. and a melting point of 285° C.

Biaxially oriented films were produced from these cycloolefin copolymers by extrusion followed by orientation. Mixtures made from COC with a glass transition temperature of 140° C. and a commercially available polypropylene homopolymer (MFR (230° C.; 2.16 kg):3.3 kg/10 min; $T_m$: 163–166° C. were also prepared by Hoechst AG. The films studied are given in Table 1.

To investigate the electret properties, an aluminum layer of 100 nm thickness was applied to one side of each film. The unmetallized side of the films was charged using a corona discharge or by bombardment with an electron beam.

The strength of the electrical field which an insulating layer of a polymer can resist is assessed by determining the dielectric strength. This is done by introducing, between two electrodes (ball/plate arrangement), a thin film of the material, the film being as uniform as possible. The potential difference present between the electrodes is continuously increased until electrical breakdown of the film takes place. The potential difference at which electrical breakdown occurs through the film is determined. These experiments were used to measure the dielectric strength of biaxially oriented films. It was from 400 to 500 kV/mm if an alternating voltage was applied and from 600 to 700 kV/mm if the voltage applied was direct. The results show that COC can store significantly higher surface charges.

The corona discharge in the examples was carried out at room temperature using a corona triode composed of a needle electrode, a grating and the film specimen. Specimens of films were generally positively or negatively charged using an electrical field of 10 kV/mm. The resultant surface voltages were in the range from 100 V to 500 V, depending on the thickness of the film.

Charging by an electron beam in the examples was carried out in vacuo at room temperature using a 10 keV electron beam. Again, the surface voltages were selected so that the electrical field was in the region of 10 kV/mm.

For biaxially oriented COC films, these experiments gave values of from 400 to 500 kV/mm if an alternating voltage was applied and from 600 to 700 kV/mm if the voltage applied was direct.

A variety of experiments were carried out in the examples to determine the behavior of the charge applied. The manner in which the charge applied falls away as a function of time is especially important for the performance of electrets. In the examples studies were made of the electret properties of biaxially oriented polypropylene films (PP), biaxially oriented polyethyleneterephthalate films (PET) and films made from the fluoropolymers Teflon FEP (fluoro-ethylene-propylene polymer) and Teflon TFE (tetrafluoroethylene) in comparison with those of cycloolefin copolymer films. Table 1 lists the materials studied.

Figures and examples are now used to describe the invention in greater detail.

Figures

Figure 2:
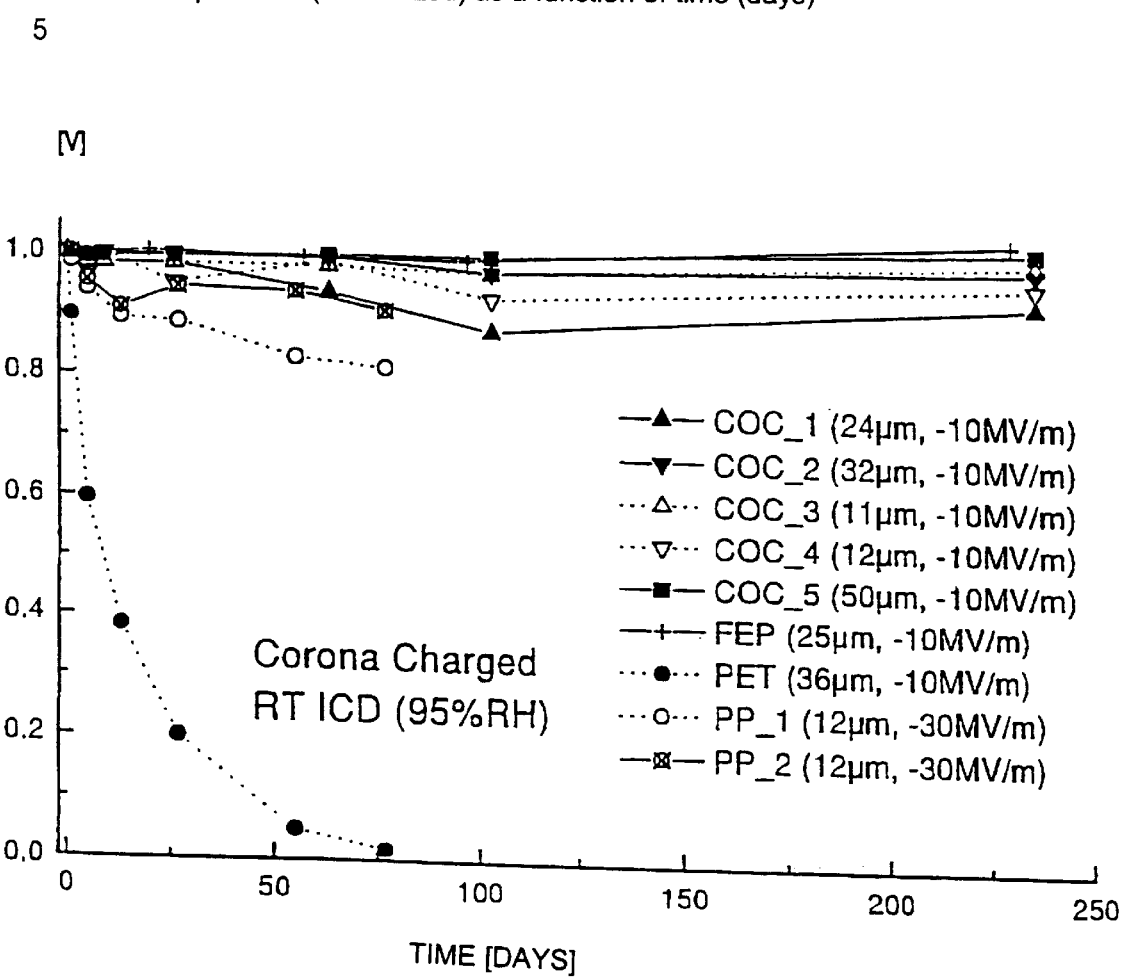
Figure 3:
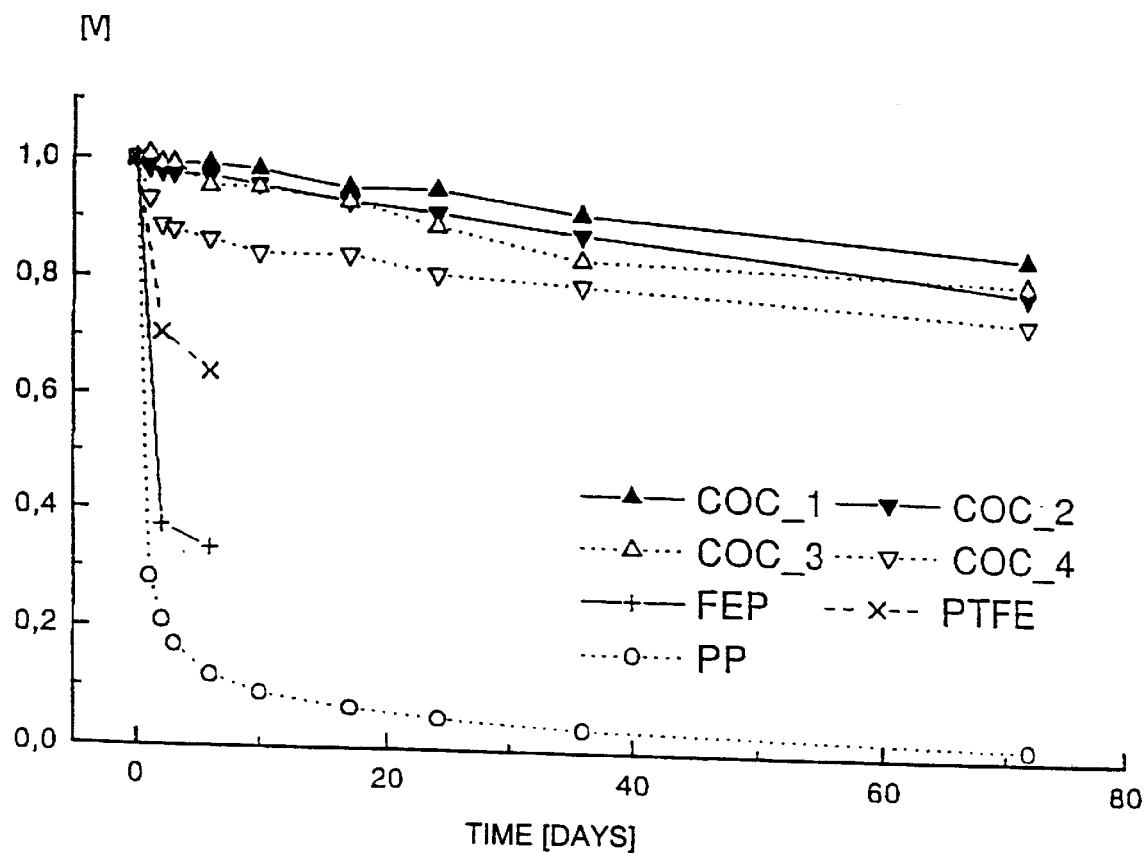
Figure 4:
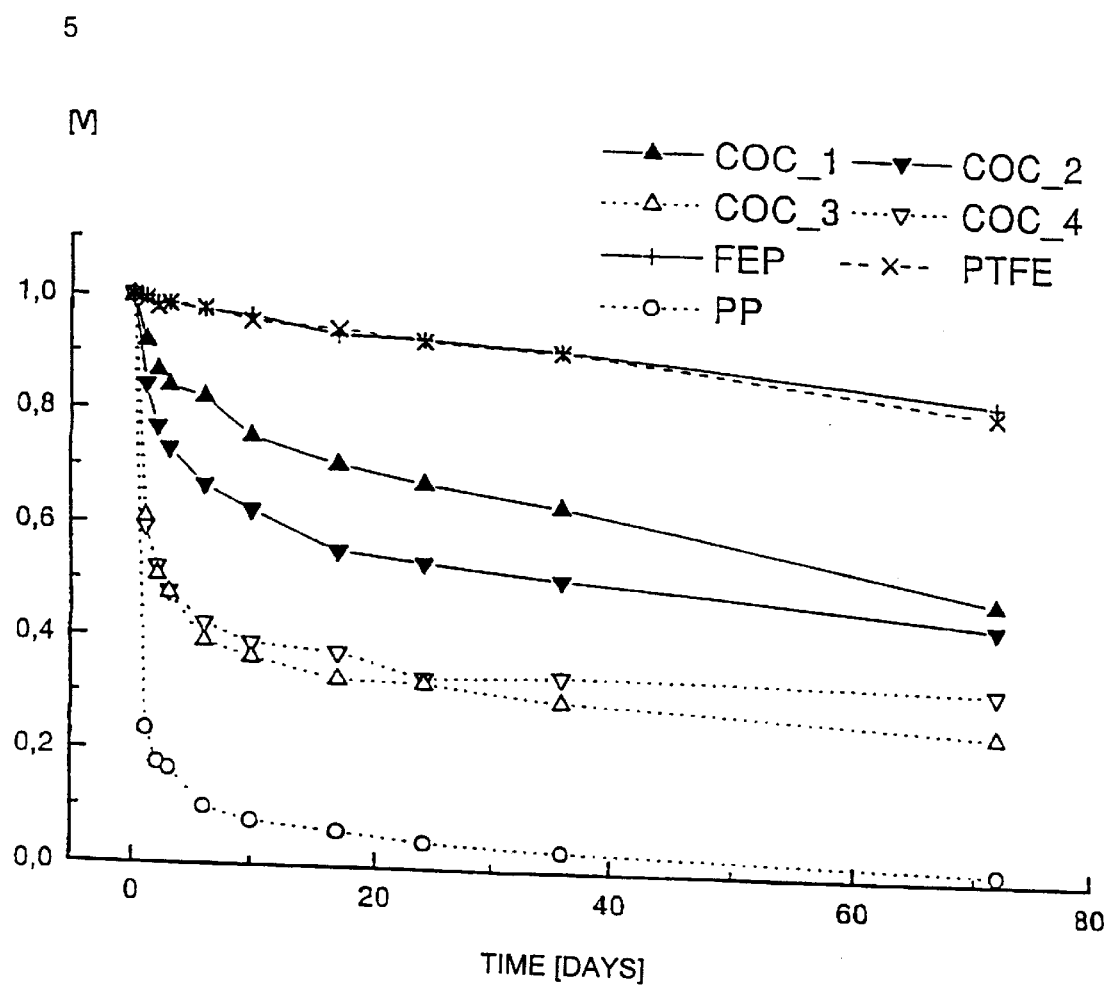
Figure 5:
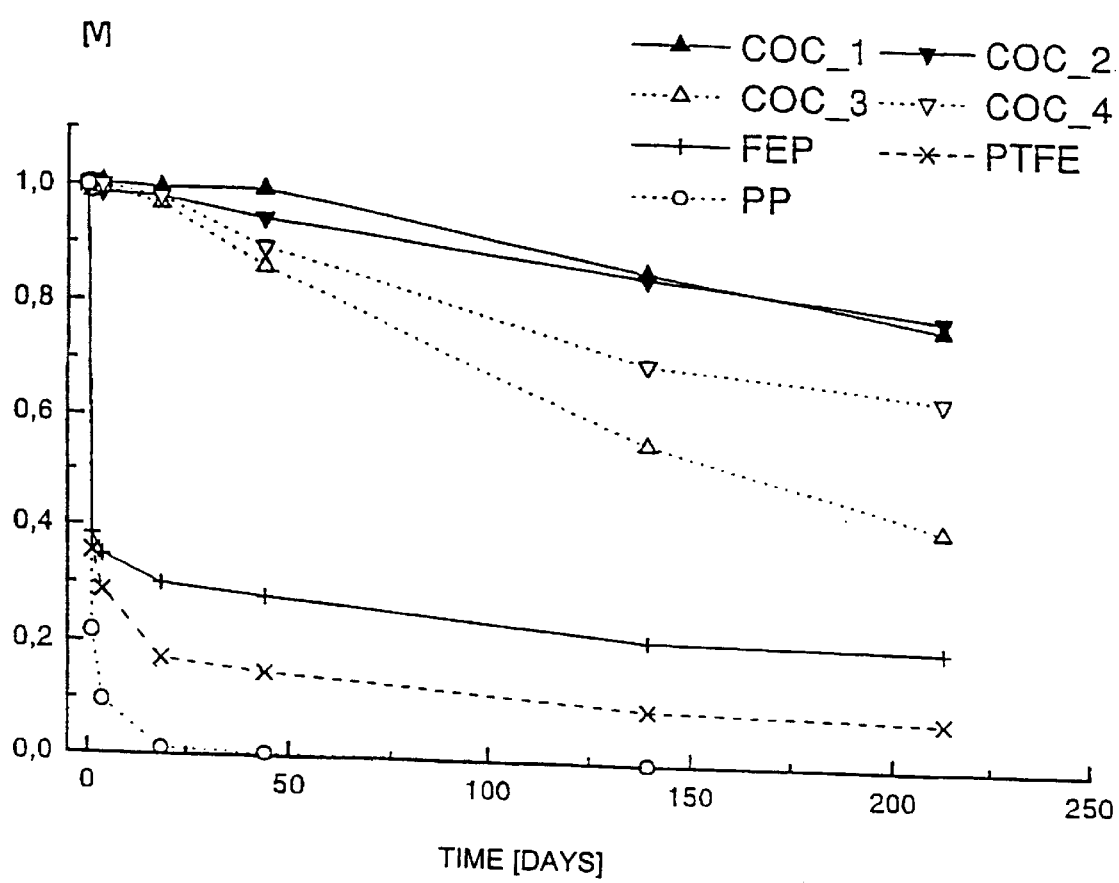
Figure 6:
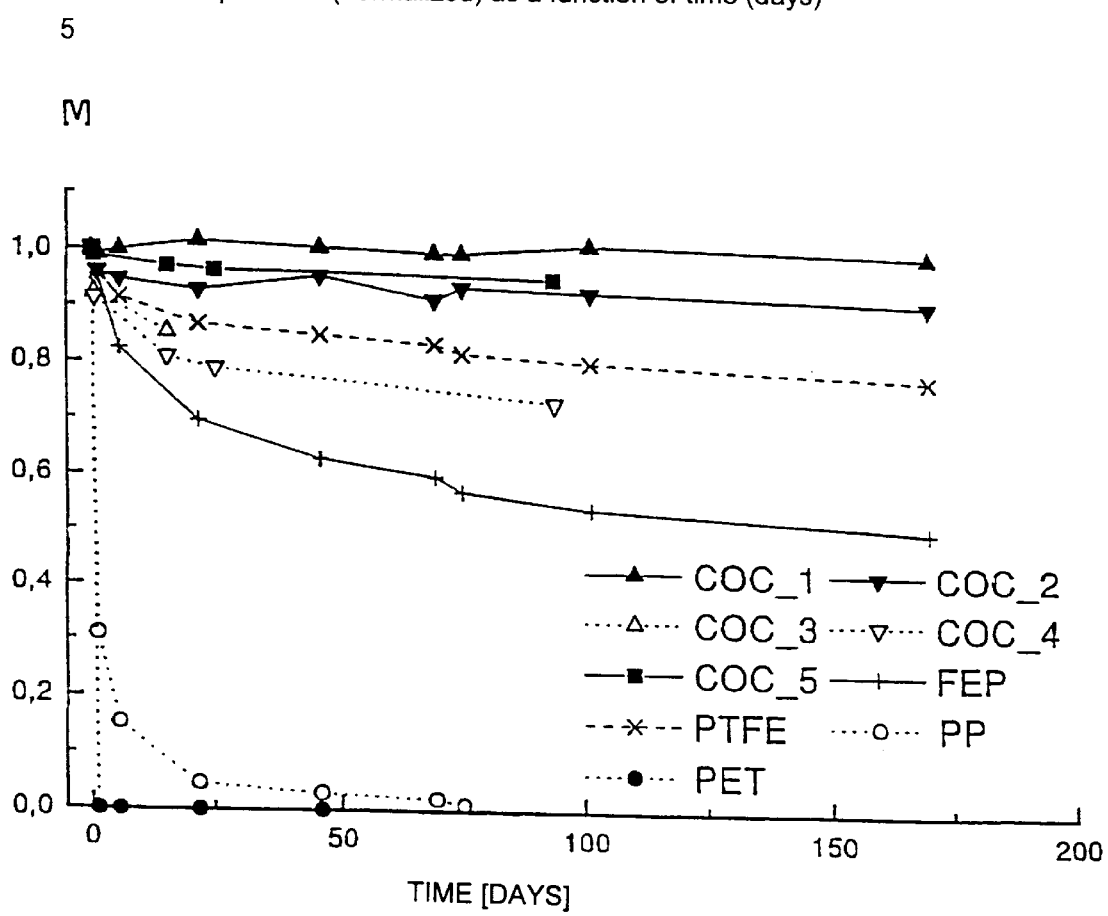
Figure 7:
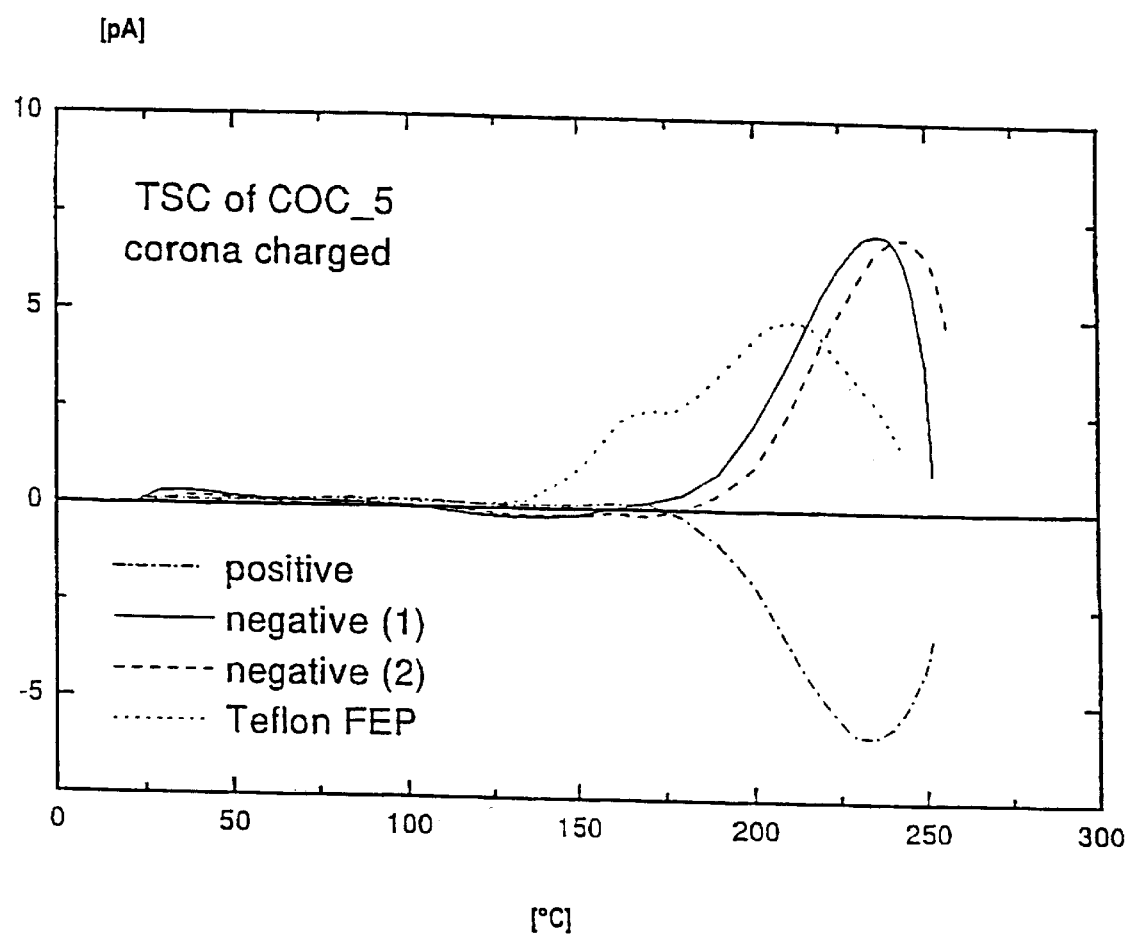
Figure 8:
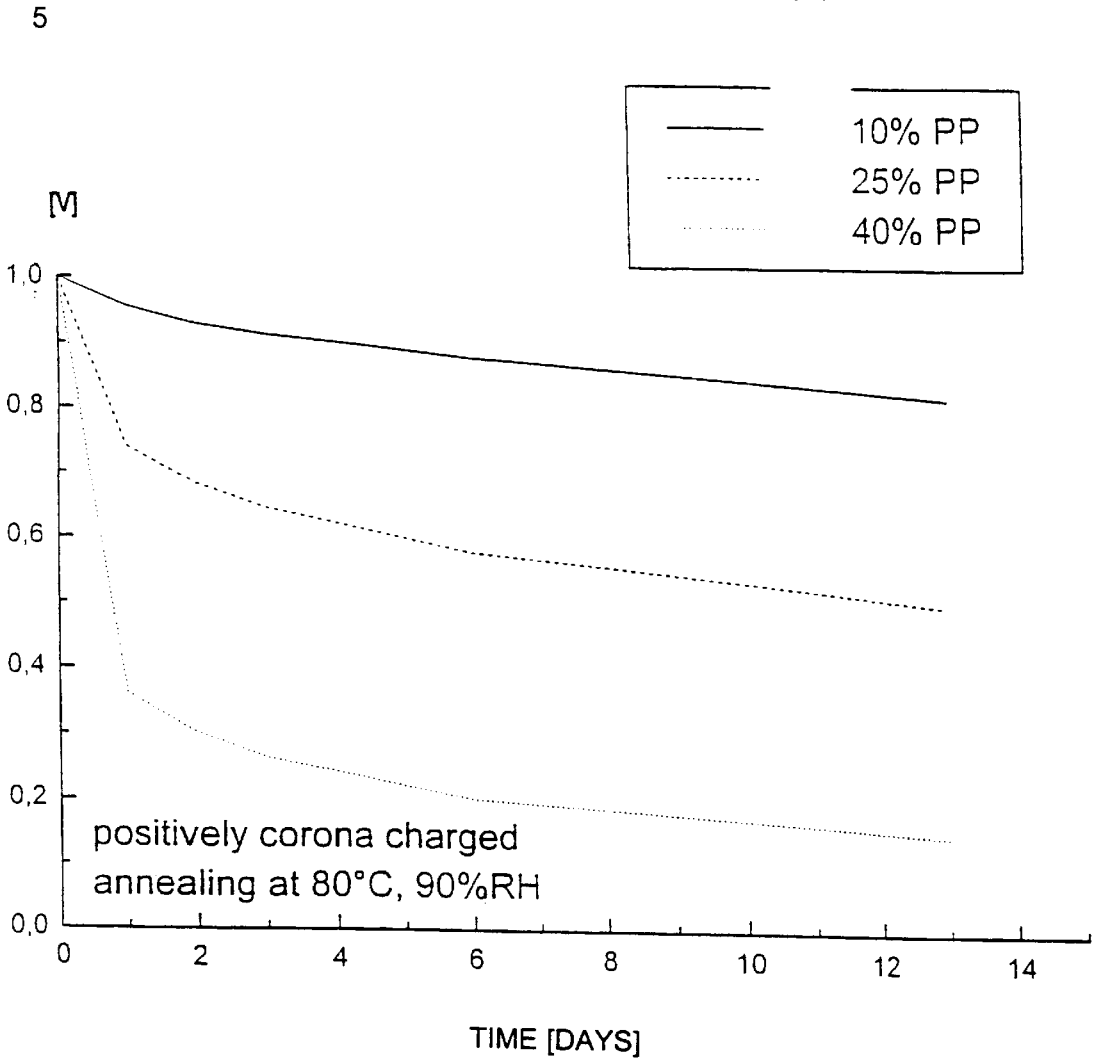
Figure 9:
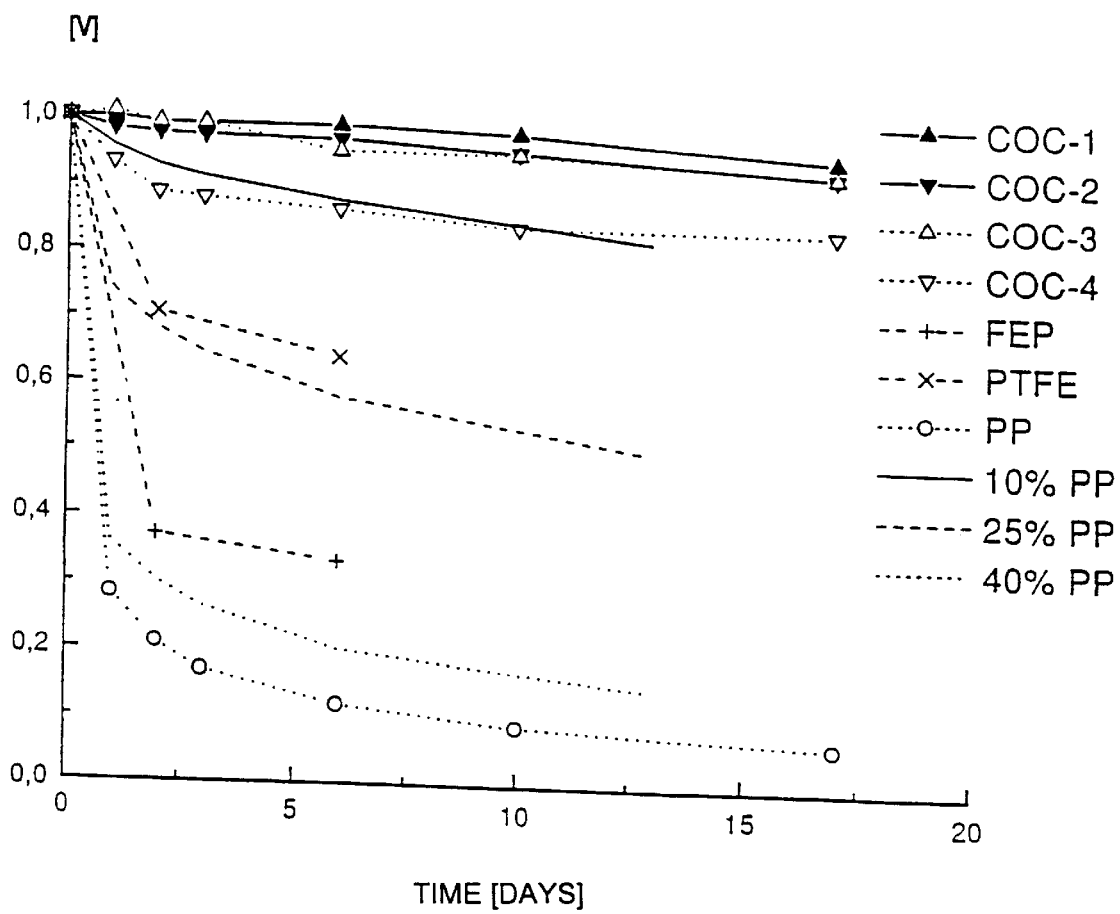
Figure 10:
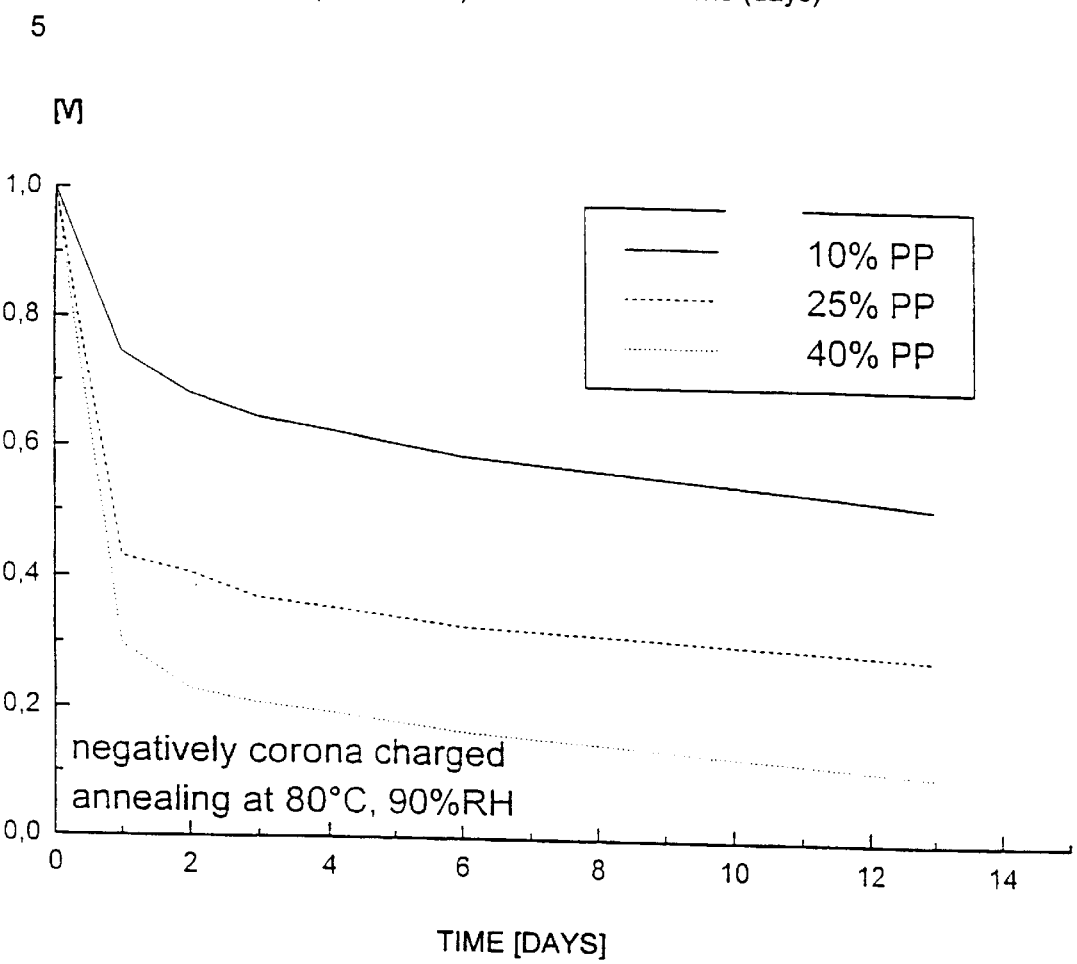
Figure 11:
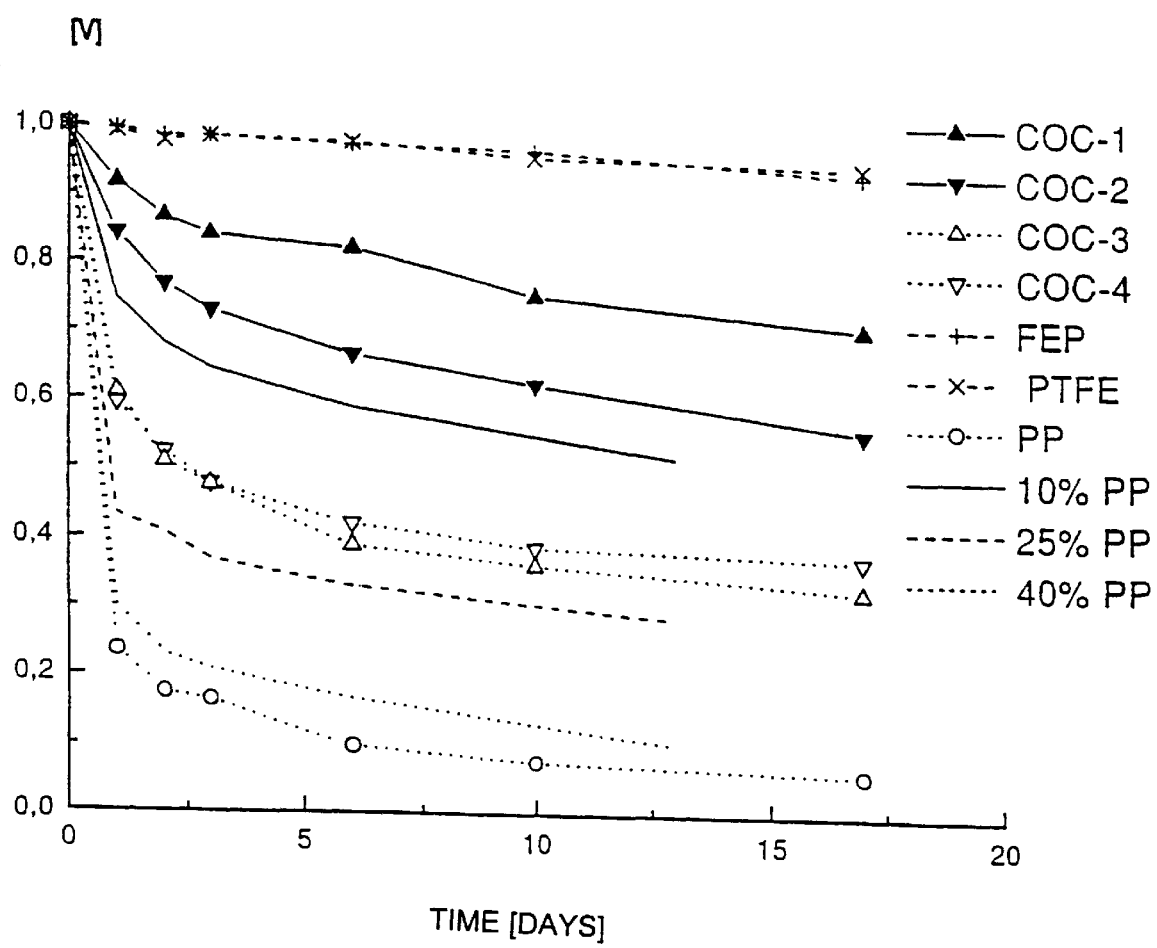

FIG. 1 shows the normalized surface potential as a function of time at room temperature and ambient humidity (from 50 to 60%), FIG. 2 shows the normalized surface potential as a function of time at room temperature and 95% relative humidity, FIG. 3 shows the normalized surface potential as a function of time for positively charged films at 80° C. and 90% relative humidity, FIG. 4 shows the normalized surface potential as a function of time for negatively charged films at 80° C. and 90% relative humidity, FIG. 5 shows the normalized surface potential as a function of time for positively charged films at 130° C. and ambient humidity (from 50 to 60%), FIG. 6 shows the normalized surface potential as a function of time for negatively charged films at 130° C. and ambient humidity (from 50 to 60%), FIG. 7 thermally induced current for COC 5 and Teflon FEP as a function of temperature FIG. 8 shows the normalized surface potential for positively charged films as a function of time at 80° C. and 90% relative humidity, FIG. 9 shows the normalized surface potential for positively charged films as a function of time at 80° C. and 90% relative humidity, FIG. 10 shows the normalized surface potential for negatively charged films as a function of time at 80° C. and 90% relative humidity, FIG. 11 shows the normalized surface potential for negatively charged films as a function of time at 80° C. and 90% relative humidity.

Cycloolefin copolymer films to which positive or negative charges have been applied have very high charge stability at room temperature, as shown in FIG. 1. When the charging field strength is 5 kV/mm the surface potentials after 350 days of storage at room temperature and ambient humidity (from 50 to 60% humidity) are from 98 to 100% of the initial surface potential.

FIG. 2 shows that, for the negatively charged cycloolefin copolymer films 1–5 no, or only very little, reduction in the surface potential takes place at a relative humidity of 95%. This is in the range from 90 to 100% of the initial surface potential after 250 days. The polyethylene terephthalate (PET) film surface potential stabilities used for comparison show a marked reduction in surface potentials to below 10% of the initial value after only 75 days.

FIG. 3 shows that positively charged cycloolefin copolymer films show surface potentials of from 80 to 90% of the initial surface potential after 75 days at a temperature of 80° C. and a relative humidity of 90%. The surface potentials of PP, FEP and PTFE reduce to values of from 5 to 50% of the initial values over this period.

FIG. 4 shows that negatively charged cycloolefin copolymer films show surface potentials of from 50 to 60% of the initial values after 75 days at a temperature of 80° C. and a relative humidity of 90%. The surface potential of PP reduces to values below 5% of the initial values over this period.

FIGS. 5 and 6 show that negatively or positively charged cycloolefin copolymer films show surface potentials of from 50 to 100% of the initial values after from 175 to 220 hours at a temperature of 130° C. and a relative humidity of from 50 to 60%. The surface potential of PP and PET reduces to 0% of the initial surface potential over this period.

FIG. 7 shows measurements of thermally induced current flow on semicrystalline COC 5 compared with Teflon FEP. The measurement was made on an open circuit. The heating rate was 200° C./h. Unlike Teflon FEP, COC 5 exhibits no current flow up to a temperature of about 175° C. The current flow maximum is at a temperature of 250° C. Positively and negatively charged films made from COC-5 show similar behavior but the current flows in the opposite direction.

FIG. 8 shows that positively corona-charged films made from mixtures of cycloolefin copolymers with polypropylene have surface potentials of from 20 to 85%, based on the initial value, after 13 days at a temperature of 80° C. and a relative humidity of 90%. The surface potential here reduces as the PP proportion increases. The highest value is 85%, for a PP proportion of 10% by weight.

FIG. 9 shows that after 13 days the films of FIG. 8 still have markedly higher surface potentials than films made from pure polypropylene and charged and stored under identical conditions.

FIG. 10 shows that negatively corona-charged films made from mixtures of cycloolefin copolymers with polypropylene have surface potentials of from 15 to 55%, based on the initial value, after 13 days at a temperature of 80° C. and a relative humidity of 90%. The surface potential here reduces as the PP proportion increases. The highest value is 55% for a PP proportion of 10% by weight.

FIG. 11 shows that after 13 days the films of FIG. 8 still have markedly higher surface potentials than films made from pure polypropylene and charged and stored under identical conditions.

EXAMPLES

Production of charged films 1 to 5 composed of cycloolefin copolymers, and also of films made from mixtures of cycloolefin copolymers with polypropylene.

Example 1

COC 1

A biaxially oriented film of thickness 24 $\mu$m was produced from an amorphous cycloolefin copolymer which contains 53% by weight of norbornene and 47% by weight of ethylene and has a glass transition temperature of 140° C., by extrusion followed by orientation. To investigate the electret properties, an aluminum layer of 100 nm thickness was applied to one side of the film. The unmetallized side of the film was charged using a corona discharge or by bombardment with an electron beam. The corona discharge was carried out at room temperature using a corona triode composed of a needle electrode, a grating and the film specimen. Specimens of films were generally positively or negatively charged using an electrical field of 10 kV/mm. This gave surface potentials of 120 V and 240 V.

Example 2

COC 2

A biaxially oriented film of thickness 32 $\mu$m was produced as described in Example 1 from an amorphous cycloolefin copolymer which contains 58% by weight of norbornene and 42% by weight of ethylene and has a glass transition temperature of 160° C., and the film was charged using an electrical field of 5 and 10 kV/mm. This gave surface potentials of 160 and 320 V.

Example 3

COC 3

A biaxially oriented film of thickness 11 $\mu$m was produced as described in Example 1 from an amorphous cycloolefin copolymer having a glass transition temperature of 140° C., and the film was charged using an electrical field of 10 kV/mm. This gave a surface potential of 110 V.

Example 4

COC 4

A biaxially oriented film of thickness 12 $\mu$m was produced as described in Example 1 from an amorphous cycloolefin copolymer having a glass transition temperature of 160° C., and the film was charged using an electrical field of 10 kV/mm. This gave a surface potential of 120 V.

Example 5

COC 5

A biaxially oriented film of thickness [lacuna] $\mu$m was produced as described in Example 1 from a semicrystalline cycloolefin copolymer which contains 50% by weight of norbornene and 50% by weight of ethylene and has a glass transition temperature of 135° C. and a melting point of 285° C., and the film was charged using an electrical field of 10 kV/mm. This gave a surface potential of 500 V.

Example 6

10% PP

A film of thickness 60 $\mu$m was produced as described in Example 1 from the COC-1 described in Example 1 (90% by weight) and 10% by weight of a propylene homopolymer (Tm: from 163 to 166° C., MFI (230° C., 2.16 kg): 3.3 g/10 min), and the film was charged using an electrical field of 10 kV/mm. The surface potential achieved was 600 V.

Example 7

25% PP

A film of thickness 25 $\mu$m was produced as described in Example 1 from the COC-1 described in Example 1 (75% by weight) and 25% by weight of a propylene homopolymer (Tm: 162° C., MFI (230° C., 2.16 kg): 3.3 g/10 min), and the film was charged using an electrical field of 10 kV/mm. The surface potential achieved was 250 V.

Example 8

40% PP

A film of thickness 50 $\mu$m was produced as described in Example 1 from the COC-1 described in Example 1 (60% by weight) and 40% by weight of a propylene homopolymer (Tm: 162° C., MFI (230° C., 2.16 kg): 3.3 g/10 min), and the film was charged using an electrical field of 10 kV/mm. The surface potential achieved was 500 V.

Comparative examples

PP, FEP, PET and PTFE

The electret properties of biaxially oriented polypropylene films (PP), biaxially oriented polyethylene, terephthalate films (PET) and films made from the fluoropolymers Teflon FEP (fluoro-ethylene-propylene polymer) and Teflon PTFE (tetrafluoroethylene) were studied in comparison with those of cycloolefin copolymer films. The production and treatment of the films was based on Example 1. Table 1 lists the materials studied.

TABLE 1

Films studied

| Material | Glass transition temperature[a] [°C.] | Melting point[a] [°C.] | Additive | Thickness [μm] | Description |
|---|---|---|---|---|---|
| COC | 140 | — | — | 24 | COC 1 |
| COC | 160 | — | — | 32 | COC 2 |
| COC | 140 | — | b) | 11 | COC 3 |
| COC | 160 | — | b) | 12 | COC 4 |
| COC | 135 | 280 | — | 50 | COC 5 |
| COC1 with PP | — | θ | — | 60 | 10% PP |
| COC1 with PP | — | — | — | 25 | 25% PP |
| COC1 with PP | — | — | — | 50 | 40% PP |
| Polypropylene-homopolymer | — | — | — | 12 | PP |
| Polyethylene terephthalate | — | — | — | 36 | PET |
| Fluoro-ethylene-propylene polymer (Teflon FEP) | — | — | — | 25 | FEP |
| Polytetrafluoro-ethylene (Teflon TFE) | — | — | — | 25 | PTFE |

[a] DSC measurement
b) 0.2% by weight of Syloblock (Grace)

The strengths of electrical field which an insulating layer of a polymer can withstand is assessed by determining the dielectric strength. This is done by introducing, between a ball and plate electrode arrangement, a thin film of the material, the film being as uniform as possible.

The potential difference applied between the electrodes is increased continuously until electrical breakdown through the film takes place. The potential difference at which breakdown takes place through the film is determined. These experiments determined the values of the electrical fields at which breakdown occurred through biaxially oriented COC films as from 400 to 500 kV/mm when an alternating voltage is applied and from 600 to 700 kV/mm when the voltage applied is direct. The values for the electrical fields are at the lower end of the electrical fields possible for charging the COC films.

What is claimed is:

1. An electret consisting essentially of mixture of at least one cycloolefin copolymer with
at least one different polyolefin,
and said cycloolefin copolymer contains from 0.1 to 100% by weight, based on the total weight of the cycloolefin polymer of polymerized units of the formulae I, II, II', III, IV, V or VI

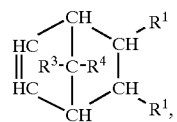
(I)

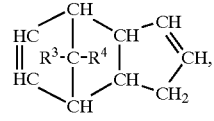
(II)

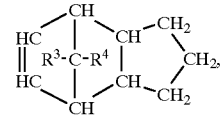
(II')

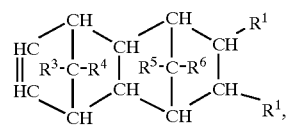
(III)

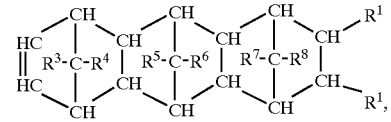
(IV)

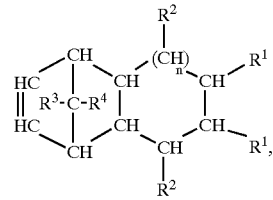
(V)

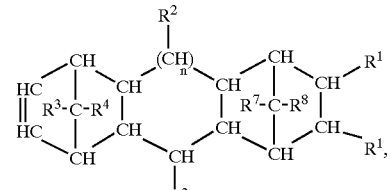
(VI)

wherein $R^1$, $R^2$, $R^3$, $R^4$, $R^5$, $R^6$, $R^7$ and $R^8$ are identical or different and are a hydrogen atom or a $C_1$–$C_{20}$-hydrocarbon radical,
wherein the same radicals $R^1$ to $R^8$ in the various formulae I to VI may have a different meaning, and where n may be from 0 to 5, and
from 0 to 99 mol %, based on the total makeup of the cycloolefin copolymer, of polymerized units which derive from one or more acyclic olefins of the formula VII

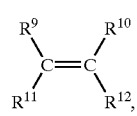
(VII)

wherein $R^9$, $R^{10}$, $R^{11}$ and $R^{12}$ are identical or different and are a hydrogen atom, a linear, branched, saturated or unsaturated $C_1$–$C_{20}$-hydrocarbon radical and
from 0 to 45 mol %, based on the total makeup of the cycloolefin copolymer, of polymerized units which derive from one or more monocyclic olefins of the formula VIII

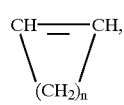
(VIII)

and n is a number from 2 to 10
and said at least one different polyolefin is selected from the group consisting of
(a) homopolymers of ethylene and propylene,
(b) copolymers of ethylene and propylene,
(c) copolymers of ethylene with a linear or branched olefin,
(d) copolymers of propylene with a linear or branched olefin and
(e) terpolymers of ethylene, propylene with a linear or branched olefin.

2. The electret as claimed in claim 1, wherein the proportion of the polymerized units which derive from polycyclic olefins is from 3 to 75 mol %, based on the total makeup of the cycloolefin copolymer.

3. The electret as claimed in claim 1, wherein the proportion of the polymerized units which derive from acyclic olefins is from 5 to 80%, based on the total makeup of the cycloolefin copolymer.

4. A process for preparing the electret as claimed in claim 1, which comprises applying an aluminum layer of thickness from 50 to 200 nm to one side of a cycloolefin copolymer film and the unmetallized side of the film is charged positively or negatively with an electrical field of from 5 to 15 kV/mm with a corona discharge or by bombardment with an electron beam and the surface potential is from 100 to 500 V.

5. The electret as claimed in claim 1, wherein said at least one cycloolefin copolymer is selected from the group consisting of polymers containing from 0.1 to 99.9% by weight, based on the total weight of the copolymer of polymerized units of at least one cyclic olefin of the formulae I, II, II', III, IV, V or VI and $R^1$, $R^2$, $R^3$, $R^4$, $R^5$, $R^6$, $R^7$, and $R^8$ are identical or different and are a hydrogen atom or a linear or branched $C_1$–$C_8$-alkyl radical, $C_6$–$C_{18}$-aryl radical or a $C_7$–$C_{20}$-alkylenearyl radical or a cyclic or acyclic $C_2$–$C_{20}$-alkenyl radical or form a saturated, unsaturated or aromatic ring and $R^9$, $R^{10}$, $R^{11}$ and $R^{12}$ are identical or different and are a hydrogen atom, a $C_1$–$C_8$-alkyl radical or a $C_6$–$C_{18}$-aryl radical.

6. A process to produce a film, fiber or non-woven electret, which comprises using the electret as claimed in claim 1.

7. The process as claimed in claim 6, wherein the film is made by extrusion or injection molding.

8. A filter which comprises the film, fiber or non-woven electret made by the process as claimed in claim 6.

9. The electret as claimed in claim 1, wherein said polyolefin is a homopolymer of ethylene and of propylene or copolymers of ethylene and propylene.

10. The electret as claimed in claim 1, wherein said polyolefin is a copolymer of ethylene with a linear olefin.

11. The electret as claimed in claim 10, wherein said olefin is butene, pentene, hexene, heptene, octene, nonene, decene, undecene or dodecene.

12. The electret as claimed in claim 1, wherein said polyolefin is a copolymer based on propylene with a linear or branched olefin selected from the group consisting of butene, pentene, hexene, heptene, octene, nonene, decene, undecene and dodecene.

13. The electret as claimed in claim 1, wherein said polyolefin is a terpolymer made from ethylene, propylene or linear or branched olefin selected from the group consisting of butene, pentene, hexene, heptene, octene, nonene, decene, undecene and dodecene.

* * * * *